(12) United States Patent
Yoshikawa et al.

(10) Patent No.: US 8,991,875 B2
(45) Date of Patent: Mar. 31, 2015

(54) THREADED JOINT FOR STEEL PIPES

(75) Inventors: Masaki Yoshikawa, Chita (JP); Takuya Nagahama, Chita (JP); Hiroshi Chikatsune, Chita (JP); Jun Takano, Chita (JP); Takamasa Kawai, Chita (JP); Kazunari Takahashi, Chita (JP); Masateru Ueta, Chita (JP); Osamu Sonobe, Chiba (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/006,245

(22) PCT Filed: Feb. 24, 2012

(86) PCT No.: PCT/JP2012/055293
§ 371 (c)(1),
(2), (4) Date: Sep. 19, 2013

(87) PCT Pub. No.: WO2012/128015
PCT Pub. Date: Sep. 27, 2012

(65) Prior Publication Data
US 2014/0049045 A1 Feb. 20, 2014

(30) Foreign Application Priority Data

Mar. 22, 2011 (JP) .................................. 2011-061942
Sep. 27, 2011 (JP) .................................. 2011-210031

(51) Int. Cl.
*F16L 25/00* (2006.01)
*F16L 15/00* (2006.01)
*F16L 15/06* (2006.01)

(52) U.S. Cl.
CPC ............... *F16L 15/001* (2013.01); *F16L 15/06* (2013.01)

USPC .......................................... 285/333; 285/334

(58) Field of Classification Search
CPC .............................. F16L 15/004; F16L 15/009
USPC .................. 285/333, 334, 355, 390
See application file for complete search history.

(56) References Cited

U.S. PATENT DOCUMENTS

| 4,623,173 A | 11/1986 | Handa et al. |
| 4,984,829 A | 1/1991 | Saigo et al. |
| 6,237,967 B1 * | 5/2001 | Yamamoto et al. ........... 285/333 |

FOREIGN PATENT DOCUMENTS

| JP | 61-44068 | 12/1986 |
| JP | 2-31271 A | 7/1990 |

(Continued)

OTHER PUBLICATIONS

International Search Report dated Apr. 3, 2012, application No. PCT/JP2012/055293.

*Primary Examiner* — Aaron Dunwoody
(74) *Attorney, Agent, or Firm* — RatnerPrestia

(57) ABSTRACT

Provided is a threaded joint for steel pipes having high sealability even under a bending load. In the threaded joint, when a pin 3 and a box 1 are threadedly connected with each other, the outer peripheral face of a nose 8 of the pin and the inner peripheral face of a nose of the box are in metal-to-metal contact with each other at a contact portion and the contact portion serves as a seal portion 20. A threaded portion, at which the externally threaded portion 7 and the internally threaded portion 5 are threadedly connected with each other, has a negative load flank angle α, shoulder portions 12 and 14 have a negative torque shoulder angle β, and the ratio $L/d_0$ of a length L of the nose and a pipe outside diameter $d_0$ is equal to or higher than 0.08.

3 Claims, 5 Drawing Sheets

(56) References Cited

FOREIGN PATENT DOCUMENTS

| | | | |
|---|---|---|---|
| JP | 06-281061 A | 10/1994 | |
| JP | 2000-081173 A | 3/2000 | |
| JP | 2005-351324 A | 12/2005 | |
| JP | 2006-526747 A | 11/2006 | |
| JP | 4208192 B2 | 1/2009 | |
| JP | 4535064 B2 | 9/2010 | |

\* cited by examiner

THREADED JOINT FOR STEEL PIPES

CROSS REFERENCE TO RELATED APPLICATIONS

This application is the U.S. National Phase application of PCT/JP2012/055293, filed Feb. 24, 2012, and claims priority to Japanese Patent Application No. 2011-061942, filed Mar. 22, 2011, and Japanese Patent Application No. 2011-210031, filed Sep. 27, 2011, the disclosures of each of these applications being incorporated herein by reference in their entireties for all purposes.

FIELD OF THE INVENTION

The present invention relates to a threaded joint for steel pipes and in particular to a threaded joint for steel pipes that has high sealability and high resistance to compression and that is preferably used for connecting steel pipes such as oil country tubular goods (OCTG) including tubing and casing that are generally used to prospect for oil wells or gas wells and to produce oil or gas, riser pipes, and line pipes.

BACKGROUND OF THE INVENTION

Threaded joints are widely used for connecting OCTG and other steel pipes used in oil industry facilities. Typically, standard threaded joints as specified in American Petroleum Institute (API) standards have been used to connect steel pipes that are used to prospect for and to produce oil and gas. However, the drilling/production environment is becoming increasingly severe in recent years because crude oil wells and natural gas wells are becoming deeper and the number of horizontal wells and directional wells are increasing relative to the number of vertical wells. Because development of wells in hostile environments such as oceans and polar regions is increasing, various characteristics such as resistance to compression, resistance to bending, sealability against external pressure (external pressure resistance) are required for a threaded joint. Therefore, an increasing number of special high-performance threaded joints, which are called premium joints, are being used, and the demand for improving the characteristics of such joints has been increasing.

Typically, a premium joint is a coupling-type joint in which a pair of externally threaded members (hereinafter referred to as pins) formed at ends of pipes and an internally threaded member (hereinafter referred to as a box) are coupled. Each of the pins includes a tapered thread, a seal portion (to be specific, a metal-to-metal seal portion), and a shoulder portion (to be specific, a torque shoulder portion). The box connects the pins to each other. The tapered thread is important for strongly fixing the pipe joint. The seal portion serves to secure sealability because the box and the pins come into metal-to-metal contact with each other in this portion. The shoulder portion forms a shoulder face (bearing face) that serves as an abutment when the joint is being fastened.

FIG. 4 schematically illustrates a premium joint for OCTG and shows a longitudinal section of a threaded joint for circular pipe. The threaded joint includes pins 3 and a box 1 corresponding to the pins 3. Each of the pins 3 includes an externally threaded portion 7 formed on an outer face thereof and a nose 8 (pin nose 8). The nose 8 is an unthreaded portion disposed at an end of the pin 3 and is adjacent to the externally threaded portion 7. The nose 8 includes a seal portion 11 on an outer peripheral face thereof and a torque shoulder portion 12 on an end face thereof. The box 1, which faces the pin 3, includes an internally threaded portion 5, a seal portion 13, and a shoulder portion 14, which are respectively capable of mating with or coming into contact with the externally threaded portion 7, the seal portion 11, and the shoulder portion 12 of the pin 3.

Patent Literatures 1 to 3 describe existing technologies related to the premium joints.

In the example illustrated in FIG. 4, the metal-to-metal seal portion is disposed at the end of the pin nose 8. Patent Literature 1 describes a threaded joint in which a metal-to-metal seal portion is disposed near a threaded portion of the pin nose 8 and the nose is elongated so as to extend from the seal portion to the shoulder portion so that the external pressure resistance is increased. In the threaded joint described in Patent Literature 1, the pin nose that is not in contact with a box member is elongated so as to form a shape that is discontinuous with the seal portion so that the thickness of the pin nose is not reduced. As a result, not only improvement in the external pressure resistance but also improvement in the resistance to axial compression are realized.

Patent Literature 2 describes a threaded joint that includes an appendix that extends from a seal portion to an end of a pin nose and that has a shape that is discontinuous with the seal portion. With the appendix, the rigidity in the radial direction is secured while the rigidity in the axial direction is reduced. The appendix becomes deformed when the threaded joint is fastened and recovers its original shape when a tensile load is applied, and thereby the tension resistance is improved.

As described in Patent Literatures 1 and 2, disposing the seal portion near the threaded portion of the pin to separate the seal portion from the end of the pin nose is effective not only in increasing the external pressure resistance and the tension resistance but also in providing the thread with stable characteristics. This can be verified through a finite element method simulation or the like. Moreover, when a strong axial compression is applied to a pin nose having a shape that is discontinuous with a seal portion, the pin nose itself becomes deformed and thereby reduces the amount of plastic deformation of a torque shoulder portion of a box member. On the other hand, a discontinuous portion between the thread and the nose may become excessively deformed. It is supposed that the occurrence of such deformation depends on a make up torque.

A make up torque is influenced by the lubrication condition, the face condition, and the like. Examples of designs that are not highly dependent on such conditions include a radial seal design with which the radial component of the seal contact pressure is relatively increased and the seal contact pressure in the radial direction is increased. For example, Patent Literature 3 describes an example of the radial direction seal design in which a pin seal has a round shape with a large diameter and a small seal taper angle. However, the radial seal design having a small seal taper angle has a problem in that galling is likely to occur when the threaded joint is fastened. In particular, when it is necessary to provide a large amount of interference of the seal in order to secure the sealability and the stability of sealing, galling is more likely to occur.

PATENT LITERATURE

PTL 1: Japanese Patent No. 4535064
PTL 2: Japanese Patent No. 4208192
PTL 3: Japanese Examined Utility Model Registration Publication No. 61-44068

SUMMARY OF THE INVENTION

As described above, existing threaded joints still have some problems and need to be improved to satisfy various requirements for the characteristics of threaded joints such as resistance to compression, sealability against external pressure, and resistance to bending. As the number of horizontal wells and directional wells has increased in recent years, a high bending load is applied to a threaded joint in addition to an axial tension as illustrated in FIG. 3. When a bending load is applied to a threaded joint, on the tension side of bending, the externally threaded portion 7 and a load flank face 15 of the internally threaded portion 5 (see FIG. 4) become relatively displaced in such a way that the fit therebetween is loosened, and the threads may become disengaged if the bending load increases further. On the compression side of bending, the torque shoulder portions 12 and 14 of the pin 3 and the box 1 serve as a support and restrain the seal portions from being separated from each other. However, if the bending load increases further, the shoulder portions 12 and 14 may slip over each other and the sealability may not be maintained.

There have been no findings about the level of load flank angle of the threaded portion, the level of the torque shoulder angles of the shoulder portions 12 and 14 adjacent to the seal portion, and the shape of the nose, with which sufficient sealability can be maintained under such a bending load.

The load flank angle is an angle (angle α in FIG. 1B) between the load flank face 15 and a line perpendicular to the axis of the threaded joint. Assuming that the line perpendicular to the axis passes through a lower end of the load flank face (an inner diameter edge on of the pin), the sign of the load flank angle is defined to be positive if the upper end of the load flank face (an outer diameter edge of the pin) is located on the distal end side of the pin relative to the line perpendicular to the axis. The load flank angle is defined to be negative if the upper end of the load flank face is located on the proximal end side of the pin relative to the line perpendicular to the axis.

The torque shoulder angle is an angle (angle β in FIG. 1C) between the shoulder face formed by the shoulder portions 12 and 14 and a line perpendicular to the axis of the threaded joint. Assuming that the line perpendicular to the axis passes through the upper end of the shoulder face (an outer diameter edge of the pin), the sign of the load flank is defined to be positive if the lower end of the shoulder face (an inner diameter edge of the pin) is located on the distal end side of the pin relative to the line perpendicular to the axis. The torque shoulder angle is defined to be negative if the lower end of the shoulder face is located on the proximal end side of the pin relative to the line perpendicular to the axis.

The inventors have found that the problems described above can be solved by making the load flank angle be a negative angle, making the torque shoulder angle be a negative angle, and by using certain combinations of the length of the nose and the pipe outside diameter.

The present invention includes the following.

(1)

A threaded joint for steel pipes includes a pin including an externally threaded portion, a nose extending from the externally threaded portion toward an end of a pipe, and a shoulder portion disposed at a distal end of the nose; and a box including an internally threaded portion that forms a threaded portion by being threadedly connected with the externally threaded portion, an inner peripheral face of a nose that faces an outer peripheral face of the nose of the pin, and a shoulder portion that is in contact with the shoulder portion of the pin. When the pin and box are threadedly connected with each other and the outer peripheral face of the nose of the pin and the inner peripheral face of the nose of the box come into metal-to-metal contact with each other at a contact portion, the contact portion serves as a seal portion. The threaded portion has a negative load flank angle, the shoulder portion has a negative torque shoulder angle, and the ratio $L/d_0$ of a length L of the nose and a pipe outside diameter $d_0$ is equal to or higher than 0.08.

(2)

In the threaded joint for steel pipes described in (1), a strain ε of the seal portion in a pipe circumferential direction, which is calculated as $\epsilon=\delta/D*100(\%)$, may be equal to or larger than 0.30%, where D is a seal diameter that is defined as an outside diameter of the pin at a seal point that is a point on the outer peripheral face of the nose of the pin at which the outer peripheral face first comes into contact with the inner peripheral face of the nose of the box and δ is an amount of interference that is defined as an amount by which the outside diameter at the seal point is reduced by the box when the pin and the box are threadedly connected with each other.

(3)

In the threaded joint for steel pipes described in (1) or (2), the torque shoulder angle of the shoulder portion of the pin and the torque shoulder angle of the shoulder portion of the box may be smaller than −15°.

With the present invention, a threaded joint for steel pipes having high sealability even under a bending load is realized.

DESCRIPTION OF EMBODIMENTS

Figure 6A:
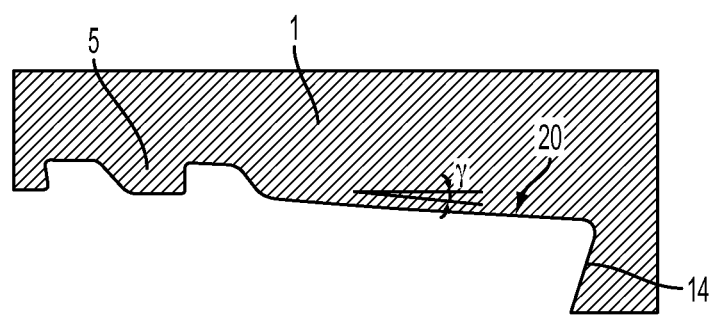
FIG. 6A is a sectional view of a box that mates with the pin of FIG. 6B and that includes a seal portion that is linearly tapered with a taper angle γ of 3°.
Figure 6B:
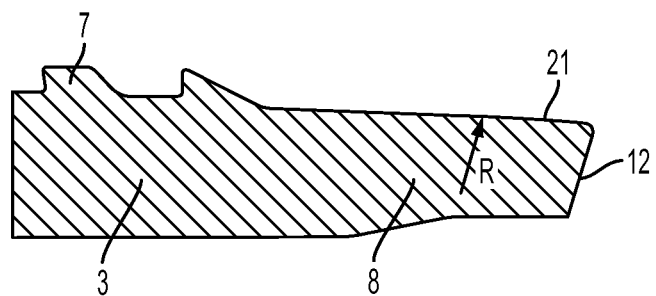

FIG. 6B is a sectional view of a pin including a pin seal portion having a pin seal face having a profile of a sectional plane including the joint axis is an arc having a radius R=3 inches.

Figure 1A:
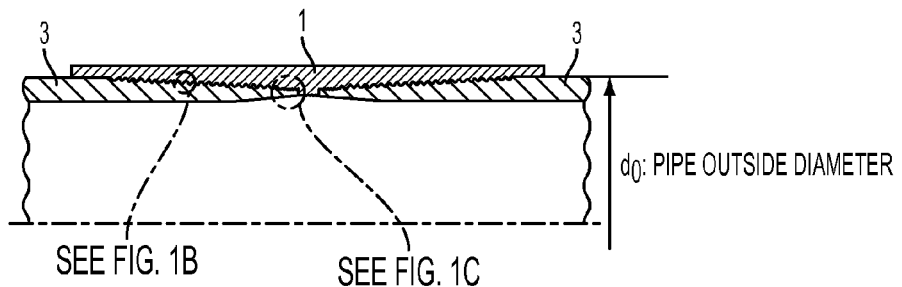
FIG. 1A is an overall sectional view of an example of an embodiment of the present invention.
Figure 1B:
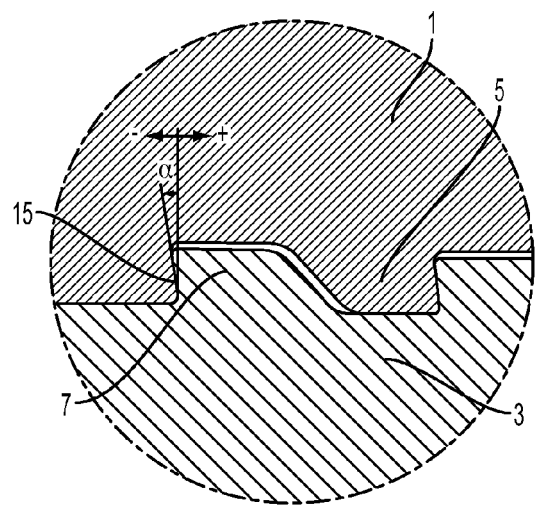
FIG. 1B is an enlarged sectional view of a threaded portion in FIG. 1A.
Figure 1C:
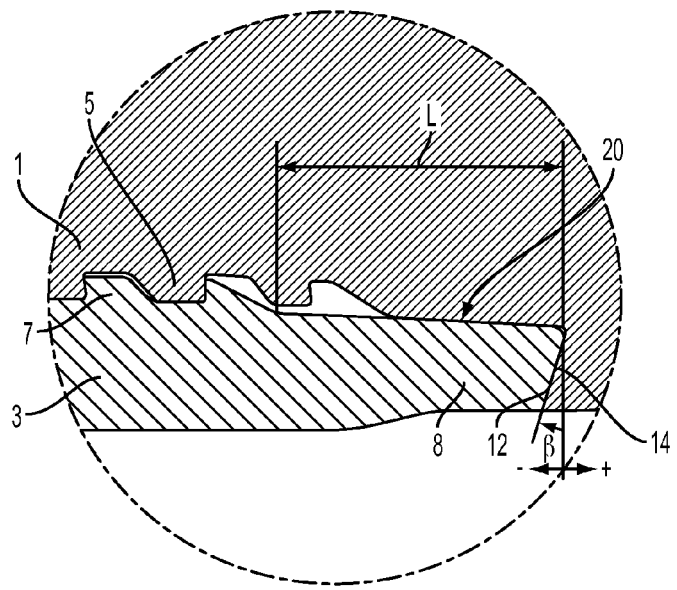
FIG. 1C is an enlarged sectional view of the vicinity of a pin nose in FIG. 1A.

As illustrated in FIGS. 1A to 1C, for example, a threaded joint for steel pipes according to an embodiment of the present invention includes a pin 3 including an externally threaded portion 7, a nose 8 extending from the externally threaded portion 7 toward an end of a pipe, and a shoulder portion 12 disposed at a distal end of the nose 8; and a box 1 including an internally threaded portion 5 that forms a threaded portion by being threadedly connected with the externally threaded portion 7, an inner peripheral face of a nose that faces an outer peripheral face of the nose of the pin 1, and a shoulder portion 14 that is in contact with the shoulder portion 12 of the pin 1. When the pin and box are threadedly connected with each other and the outer peripheral face of the nose of the pin and the inner peripheral face of the nose of the box come into metal-to-metal contact with each other at a contact portion, the contact portion serves as a seal portion 20. The threaded joint is a radial seal type threaded joint in which the seal portion of the pin is toroidal (has a toroidal sealing face) and the box is linearly tapered. In the threaded joint, the threaded portion has a negative load flank angle α as illustrated in FIG. 1B, the shoulder portion has a negative torque shoulder angle β as illustrated in FIG. 1C, and the ratio $L/d_0$ of a length L of the nose and a pipe outside diameter $d_0$ is equal to or higher than 0.08.

By making the load flank angle α be negative and preferably equal to or smaller than −4 degrees, disengagement of threads on the tension side of bending can be prevented.

Moreover, by making the torque shoulder angle β be negative and preferably smaller than −15 degrees, a supporting point against bending on the compression side of bending is provided and restrains the seal portion from being separated.

By making the ratio $L/d_0$ of the length of the nose (nose length) L and the pipe outer diameter $d_0$ be equal to or higher than 0.08, a part of the nose between the threaded portion and the shoulder portion is made flexible and thereby deformation of the threaded portion and the shoulder portion, which serve as the supporting point of bending, can be reduced.

By using combinations of these configurations, slipping at the contact face between pipes and the threaded joint can be prevented and sealability is secured by maintaining fit between the pipes and the threaded joint.

It is preferable that the load flank angle α be equal to or larger than −7 degrees, because a negative load flank angle having an excessively large absolute value is disadvantageous in terms of resistance to galling. It is more preferable that the load flank angle α be in the range of −5.5 to −4.5 degrees.

It is preferable that the torque shoulder angle β be equal to or larger than −20 degrees, because a torque shoulder angle having an excessively large absolute value is disadvantageous in securing sealability after a compressive load is applied.

It is more preferable that the torque shoulder angle β be in the range of −18 to −16 degrees.

It is preferable that the ratio of the nose length and the pipe outside diameter $L/d_0$ be equal to or smaller than 0.14, because, if this ratio is excessively high, the seal portion slides over a large distance while the joint is being fastened, which is disadvantageous in terms of resistance to galling, and the time required for machining the seal portion increases. It is more preferable that the ratio be in the range of 0.08 to 0.11.

Figure 2:
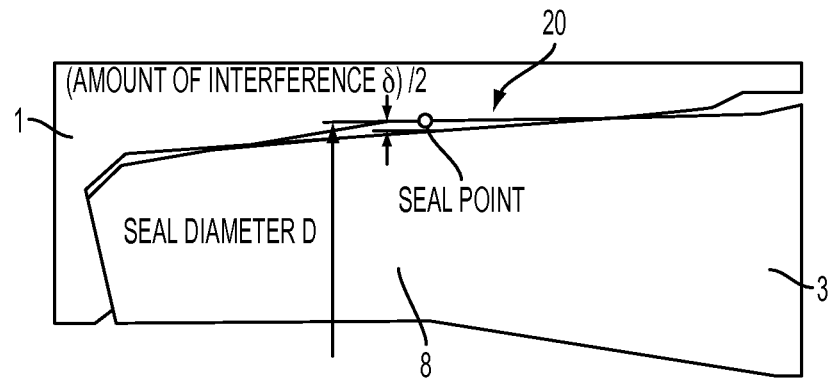
FIG. 2 is a sectional view illustrating the definition of the strain ε of the seal portion in the circumferential direction.
Figure 3:
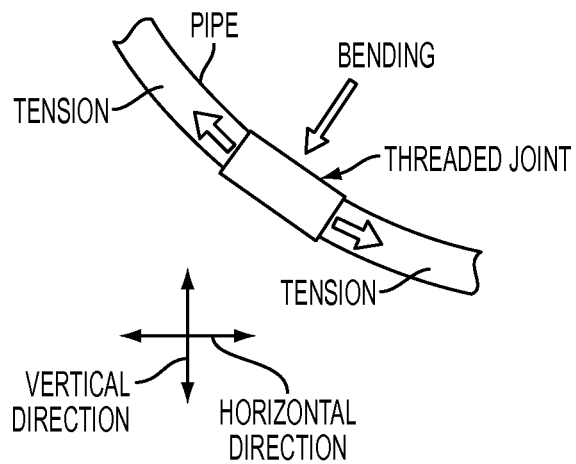
FIG. 3 is a schematic view of threaded joint to which a bending load is applied.
Figure 4A:
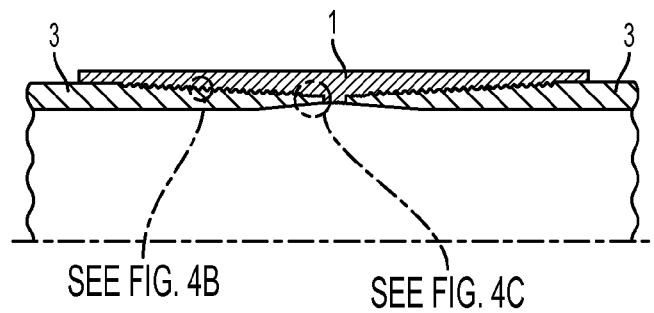
FIG. 4A is an overall sectional view of an existing threaded joint for steel pipes.
Figure 4B:
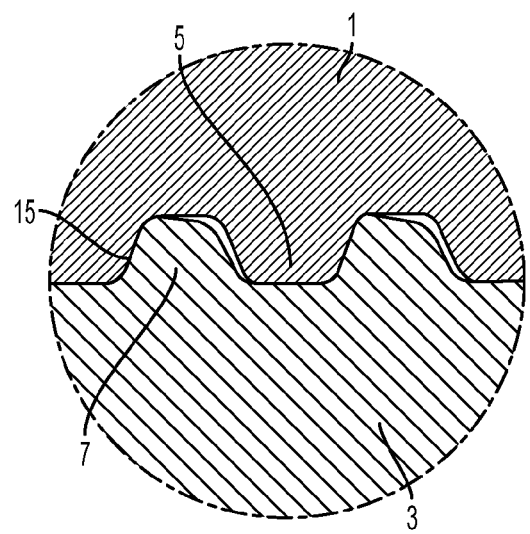
FIG. 4B is an enlarged sectional view of a threaded portion in FIG. 4A.
Figure 4C:
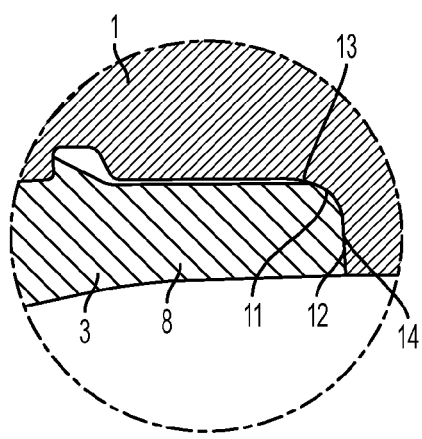
FIG. 4C is an enlarged sectional view of the vicinity of a pin nose in FIG. 4A.

Making a strain ε of the seal portion in the pipe circumferential direction be equal to or larger than 0.30% is effective in further improving the sealability. The strain ε is calculated as $\epsilon=\delta/D*100(\%)$, where D is the seal diameter and δ is the amount of interference. Here, as illustrated in FIG. 2, the seal diameter D is the outside diameter of the pin 3 at a seal point that is a point on the outer peripheral face of the nose of the pin 3 that first comes into contact with the inner peripheral face of the nose of the box 1 when the pin 3 and the box 1 are threadedly connected with each other, and the amount of interference δ is the amount by which the outside diameter of the pin 3 at the seal point is reduced by the box 1 when the pin 3 and the box 1 are threadedly connected with each other.

It is preferable that the strain ε of the seal portion in the circumferential direction be equal to or smaller than 0.7%, because an excessively large strain is disadvantageous in terms of resistance to galling. It is more preferable that the strain ε be in the range of 0.3% to 0.6%.

EXAMPLES

Radial seal type threaded joints each including a pin 3 and a box 1 were prepared. The pins 3 were made by machining ends of steel pipes having outside diameters $d_0$ (inch) shown in Tables 1-1, 1-2, and 1-3. Each of the pins 3 included a pin seal portion 21 having a toroidal shape, and a profile (R in FIG. 6B) of the pin seal face in a sectional plane passing through the joint axis had an arc shape with radius R=3 inches. The boxes 1, which were fitted to the pins 3, each had a seal portion 20 having a linearly tapered shape with a taper angle (γ in FIG. 6A) of 3°. A type-1 test, which included a sealability test A, a sealability test B (including bending), and a sealability test C, was carried out on the threaded joints whose values of $L/d_0$ and $\epsilon=\delta/D*100(\%)$ are shown in Tables 1-1, 1-2, and 1-3 on the basis of ISO 13679. The results are also shown in Table 1. In Table 1, "×" (bad) shows that a seal failure occurred, and "○" (good) shows that a seal failure did not occur. Invention examples did not cause seal failures and showed high sealability. In contrast, comparative examples caused seal failures.

Next, a type-2 test, in which the sealability test B was performed with a higher load, was carried out. This test will be described below.

Figure 5:
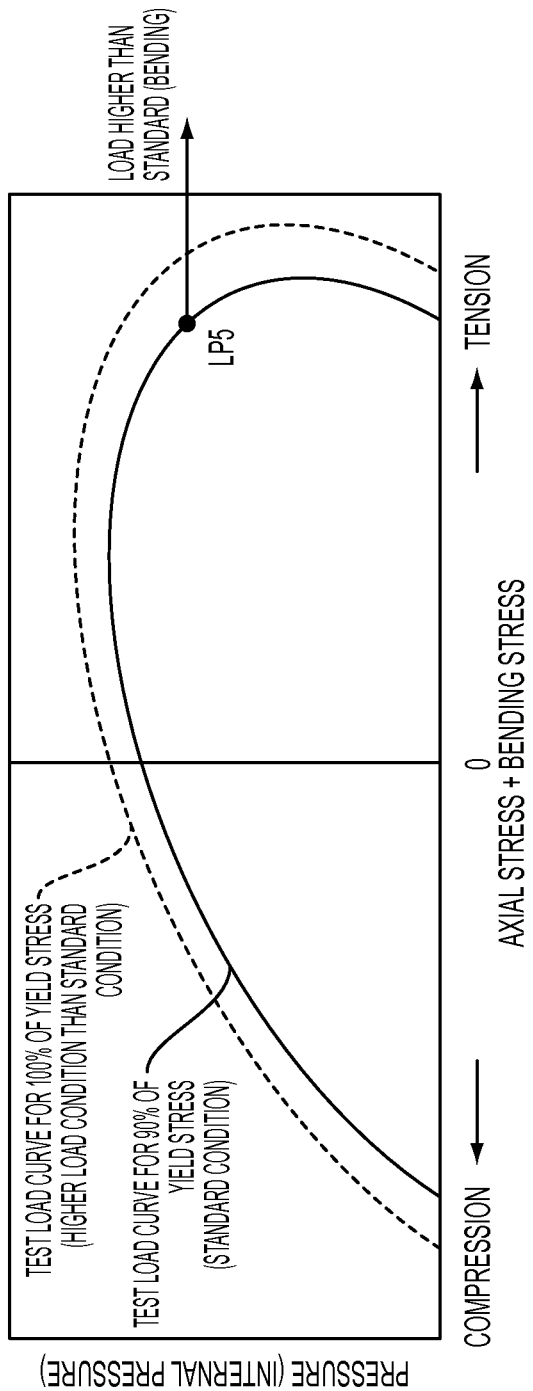
FIG. 5 is a graph representing a load condition of a sealability test B and a load condition of a type-2 test.

FIG. 5 is a graph representing, for example, a load condition of the sealability test B as specified in ISO 13679. The horizontal axis represents an axial stress that occurs in a pipe due to tension (compression)/bending, and the vertical axis represents an internal pressure that is applied to the inner face of the pipe. The outer curve illustrated by a broken line shows that an equivalent stress when tension (compression)/bending/internal pressure are compositely applied is equivalent to the yield stress of a material (100% of the yield stress). The inner curve illustrated by a solid line corresponds to a case where the equivalent stress is 90% of the yield stress of a material. The sealability test B of the type-1 test was performed to determine whether or not a seal failure occurred by using points on this 90% load curve as evaluation points.

As a result, as shown in Tables 1-1 and 1-2, the invention examples 1 to 12, in which the radio $L/d_0$ of the length of the nose and the pipe outside diameter was equal to or higher than 0.08, did not cause sealing failures in the sealability tests (A, B, C) of the type-1 test.

In the type-2 test, by using samples of the invention examples 1 to 12, which had not caused sealing failures, a bending load exceeding the maximum bending condition as specified in the standard was applied at a point LP5 of the sealability test B (including bending) and thereby the limit of bending condition that did not cause a seal failure was examined. That is, at the point LP5 on the test load curve of the sealability test B illustrated by the solid line in FIG. 5, a load condition under which a seal failure began to occur was examined by increasing the equivalent stress by further increasing the bending load from the equivalent stress of 90% of the yield stress as indicated by an arrow in the figure.

As a result, it was confirmed as shown in Tables 1-1 and 1-2, in the invention examples 1 to 10, where the amount of interference ε was equal to or larger than 0.30%, a seal failure did not occur even when the equivalent stress was increased to 100% of the yield stress (the intersection of the arrow and the broken line in FIG. 5).

In the invention examples 6 to 10, where the torque shoulder angle β was smaller than −15 degrees, a seal failure did not occur even when the equivalent stress was increased to 105% of the yield stress.

REFERENCE SIGNS LIST 1 box
3 pin
5 internally threaded portion 7 externally threaded portion
8 nose (pin nose)
11, 13, 20 seal portion (to be specific, metal-to-metal seal portion)
12, 14 shoulder portion (to be specific, torque shoulder portion)
15 load flank face
21 pin seal portion

TABLE 1-1

|  |  | Invention Example 1 | Invention Example 2 | Invention Example 3 | Invention Example 4 | Invention Example 5 | Invention Example 6 |
|---|---|---|---|---|---|---|---|
| Steel Pipe Outside Diameter $d_0$ (inch) |  | 7 | 7.625 | 9.625 | 9.875 | 7 | 7.625 |
| Nose | $L/d_0$ | 0.086 | 0.103 | 0.082 | 0.087 | 0.140 | 0.103 |
|  | $\epsilon$ (%) | 0.43 | 0.45 | 0.38 | 0.39 | 0.36 | 0.45 |
| Shoulder Portion | Shoulder Angle (°) | −15 | −15 | −15 | −15 | −15 | −17 |
| Threaded Portion | Load Flank Angle (°) | −5 | −5 | −5 | −5 | −5 | −4 |
| Type-1 Test | Results of Sealability Leak Tests (A, B, C) | ○ | ○ | ○ | ○ | ○ | ○ |
| Type-2 Test | Equivalent Stress when Leak Occurred/ Yield Stress | >100% | >100% | >100% | >100% | >100% | >105% |

TABLE 1-2

|  |  | Invention Example 7 | Invention Example 8 | Invention Example 9 | Invention Example 10 | Invention Example 11 | Invention Example 12 |
|---|---|---|---|---|---|---|---|
| Steel Pipe Outside Diameter $d_0$ (inch) |  | 9.625 | 9.875 | 9.625 | 9.625 | 9.625 | 9.625 |
| Nose | $L/d_0$ | 0.082 | 0.087 | 0.082 | 0.082 | 0.082 | 0.080 |
|  | $\epsilon$ (%) | 0.38 | 0.39 | 0.31 | 0.30 | 0.28 | 0.26 |
| Shoulder Portion | Shoulder Angle (°) | −17 | −17 | −17 | −17 | −17 | −17 |
| Threaded Portion | Load Flank Angle (°) | −4 | −5 | −4 | −4 | −4 | −4 |
| Type-1 Test | Results of Sealability Leak Tests (A, B, C) | ○ | ○ | ○ | ○ | ○ | ○ |
| Type-2 Test | Equivalent Stress when Leak Occurred/ Yield Stress | >105% | >105% | >105% | >105% | 97% | 95% |

TABLE 1-3

|  |  | Comparative Example 1 | Comparative Example 2 | Comparative Example 3 | Comparative Example 4 | Comparative Example 5 | Comparative Example 6 |
|---|---|---|---|---|---|---|---|
| Steel Pipe Outside Diameter $d_0$ (inch) |  | 7 | 7.625 | 9.625 | 9.625 | 9.625 | 9.625 |
| Nose | $L/d_0$ | 0.074 | 0.074 | 0.074 | 0.074 | 0.074 | 0.074 |
|  | $\epsilon$ (%) | 0.43 | 0.45 | 0.38 | 0.28 | 0.28 | 0.28 |
| Shoulder Portion | Shoulder Angle (°) | −15 | −15 | −15 | −5 | −10 | −15 |
| Threaded Portion | Load Flank Angle (°) | −5 | −5 | −5 | −5 | −5 | 0 |
| Type-1 Test | Results of Sealability Leak Tests (A, B, C) | X | X | X | X | X | X |
| Type-2 Test | Equivalent Stress when Leak Occurred/ Yield Stress | — | — | — | — | — | — |

The invention claimed is:

1. A threaded joint for steel pipes comprising:

a pin including an externally threaded portion, a nose extending from the externally threaded portion toward an end of a pipe, and a shoulder portion disposed at a distal end of the nose; and a box including an internally threaded portion that forms a threaded portion by being threadedly connected with the externally threaded portion, an inner peripheral face that faces an outer peripheral face of the nose of the pin, and a shoulder portion that is in contact with the shoulder portion of the pin, wherein, when the pin and box are threadedly connected with each other and the outer peripheral face of the nose of the pin and the inner peripheral face of the nose of the box come into metal-to-metal contact with each other at a contact portion, the contact portion serves as a seal portion, and wherein the threaded portion has a negative load flank angle, the shoulder portion has a negative torque shoulder angle, and the ratio $L/d_0$ of a length L of the nose and a pipe outside diameter $d_0$ is equal to or higher than 0.08;

wherein the length L of the nose is the length measured from the externally threaded portion of the pin to the end of the pipe.

2. The threaded joint for steel pipes according to claim 1, wherein a strain $\epsilon$ of the seal portion in a pipe circumferential direction, which is calculated as $\epsilon=\delta/D*100(\%)$, is equal to or larger than 0.30%, where D is a seal diameter that is defined as an outside diameter of the pin at a seal point that is a point on the outer peripheral face of the nose of the pin at which the outer peripheral face first comes into contact with the inner peripheral face of the nose of the box and $\delta$ is an amount of interference that is defined as an amount by which the outside diameter at the seal point is reduced by the box when the pin and the box are threadedly connected with each other.

3. The threaded joint for steel pipes according to claim 1, wherein the torque shoulder angle of the shoulder portion of the pin and the torque shoulder angle of the shoulder portion of the box are smaller than −15°.

* * * * *